(12) United States Patent
Schneider et al.

(10) Patent No.: US 7,731,231 B2
(45) Date of Patent: *Jun. 8, 2010

(54) AIRBAG VENT TUBE

(75) Inventors: David W. Schneider, Waterford, MA (US); Changsoo Choi, Rochester, MI (US)

(73) Assignee: Autoliv ASP, Inc., Ogden, UT (US)

( * ) Notice: Subject to any disclaimer, the term of this patent is extended or adjusted under 35 U.S.C. 154(b) by 177 days.

This patent is subject to a terminal disclaimer.

(21) Appl. No.: 11/786,559

(22) Filed: Apr. 12, 2007

(65) Prior Publication Data

US 2008/0252052 A1  Oct. 16, 2008

(51) Int. Cl.
*B60R 21/239* (2006.01)
(52) U.S. Cl. .................... 280/739; 280/743.1
(58) Field of Classification Search ............... 280/736, 280/739, 742, 743.1
See application file for complete search history.

(56) References Cited

U.S. PATENT DOCUMENTS

| | | | | |
|---|---|---|---|---|
| 4,126,325 A | * | 11/1978 | Weman | 280/738 |
| 5,246,250 A | * | 9/1993 | Wolanin et al. | 280/739 |
| 5,366,242 A | | 11/1994 | Faigle et al. | |
| 5,405,166 A | * | 4/1995 | Rogerson | 280/739 |
| 6,126,191 A | | 10/2000 | Pepperine et al. | |
| 6,139,048 A | | 10/2000 | Braunschädel | |
| 6,550,807 B1 | | 4/2003 | Faigle et al. | |
| 6,648,371 B2 | | 11/2003 | Vendely et al. | |
| 6,746,045 B2 | | 6/2004 | Short et al. | |
| 6,959,945 B2 | | 11/2005 | Fischer et al. | |
| 6,991,258 B2 | * | 1/2006 | Hawthorn et al. | 280/742 |
| 7,017,945 B2 | * | 3/2006 | DePottey et al. | 280/739 |
| 7,036,843 B2 | * | 5/2006 | Okamoto et al. | 280/728.3 |
| 7,261,319 B2 | * | 8/2007 | DePottey et al. | 280/739 |
| 7,318,602 B2 | * | 1/2008 | DePottey et al. | 280/739 |
| 7,328,915 B2 | * | 2/2008 | Smith et al. | 280/739 |
| 7,347,450 B2 | * | 3/2008 | Williams et al. | 280/739 |
| 7,413,218 B2 | * | 8/2008 | Ekdahl | 280/739 |
| 2002/0121770 A1 | | 9/2002 | Schneider | |
| 2003/0209895 A1 | * | 11/2003 | Gu | 280/739 |
| 2005/0098991 A1 | * | 5/2005 | Nagai et al. | 280/743.1 |
| 2006/0208472 A1 | | 9/2006 | De Pottey et al. | |
| 2008/0073893 A1 | | 3/2008 | Schneider | |
| 2008/0252053 A1 | | 10/2008 | Schneider et al. | |

OTHER PUBLICATIONS

Notification of Transmittal of the International Search Report and the Written Opinion of the International Searching Authority issued Aug. 1, 2008 in International Application No. PCT/US2008/052254.

(Continued)

*Primary Examiner*—Paul N Dickson
*Assistant Examiner*—Laura Freedman
(74) *Attorney, Agent, or Firm*—Sally J Brown; Stoel Rives LLP

(57) ABSTRACT

An airbag module comprising a housing with an inflatable airbag cushion disposed therein and at least one vent tube attached to the inflatable airbag cushion, wherein during inflatable airbag cushion deployment with an obstruction, the at least one vent tube remains open, and during inflatable airbag cushion deployment without an obstruction, the at least one vent tube at least partially closes.

9 Claims, 6 Drawing Sheets

OTHER PUBLICATIONS

Restriction Requirement issued Mar. 9, 2009 in co-pending U.S. Appl. No. 12/133,267.
Response to Requirement for Election of Species filed Apr. 9, 2009 in co-pending U.S. Appl. No. 12/133,267.
Office Action issued May 15, 2009 in co-pending U.S. Appl. No. 12/133,267.
Amendment and Response to Office Action filed Nov. 16, 2009 in co-pending U.S. Appl. No. 12/133,267.
Notice of Allowance and Fee(s) Due issued Feb. 9, 2010 in co-pending U.S. Appl. No. 12/133,267.
Request for Continued Examination filed Mar. 2, 2010 in co-pending U.S. Appl. No. 12/133,267.
Office Action issued Sep. 4, 2009 in co-pending U.S. Patent Application No. 12/204,626.
Amendment and Response to Office Action filed Mar. 2, 2010 in co-pending U.S. Appl. No. 12/204,626.

* cited by examiner

AIRBAG VENT TUBE

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings as listed below.

INDEX OF ELEMENTS IDENTIFIED IN THE DRAWINGS

- 100 airbag module
- 110 airbag module housing
- 115 inflator
- 120 diffuser
- 130 housing opening
- 200 airbag cushion
- 230 vent tube
- 234 vent tube exit
- 300 airbag cushion
- 310 airbag module housing
- 313 housing opening
- 315 inflator
- 320 diffuser
- 330 vent tube
- 335 tether
- 400 airbag cushion
- 410 airbag module housing
- 430 vent tube
- 490 occupant

DETAILED DESCRIPTION

Described below are embodiments of a motor vehicle airbag module and airbag cushion vent tube. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to vehicle airbag cushions of various shapes and sizes.

Airbag cushions are frequently located in an instrument panel and directly in front of an occupant. During a collision, an airbag cushion inflates and deploys through a cosmetic cover. The airbag cushion deploys towards the occupant and provides a restraint.

Full inflation of an airbag is not always desired when there is an obstruction in the path of deployment such as when an occupant is near or out of position relative to the airbag cover. An out-of-position occupant may experience punch-out forces when the airbag initially breaks through the cover and deploys into the near or out-of-position occupant. In such cases, a partial airbag inflation may offer optimal protection. For example, partial airbag inflation may be desired when the occupant being protected by the airbag cushion is a child, a baby in a rear facing car seat or an adult positioned too close to the air bag cushion. Embodiments described below include vehicle airbag systems that respond to an occupant's position and control the airbag cushion inflation to avoid excessive punch-out and deployment forces.

Figure 1:
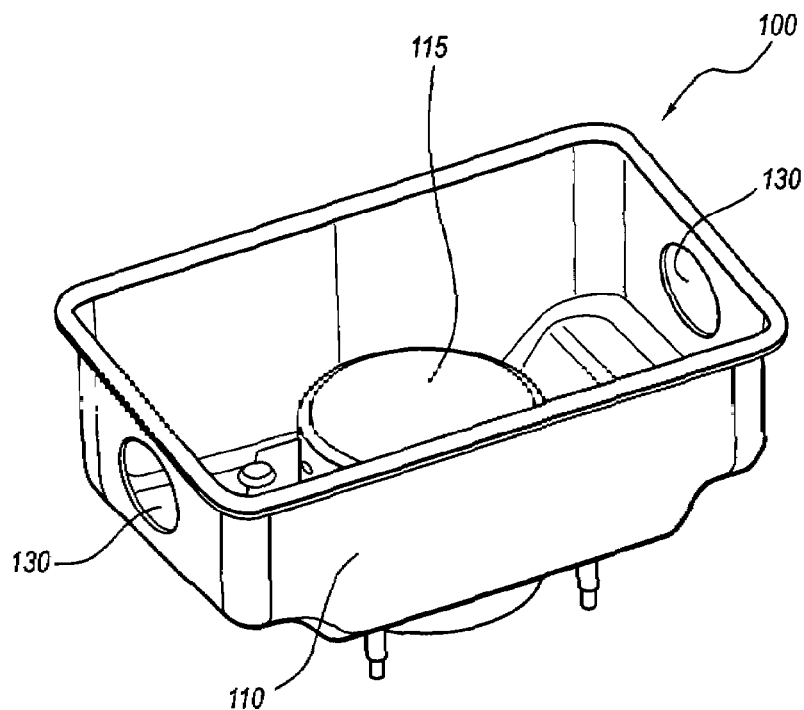
FIG. 1 is a schematic view of an airbag module.

With reference now to the accompanying figures, particular embodiments of the invention will now be described in greater detail. FIG. 1 is a perspective view which shows an airbag module 100 which can include a module housing 110 and an inflator 115 configured to deliver gas into an airbag cushion such as the airbag cushion 200 shown in FIG. 2. The airbag cushion 200 may include at least one vent tube, such as vent tubes 230. Gas may enter the interior of the airbag cushion 200 through the inflator 115 and completely inflate the airbag cushion 200 during deployment. The gas may also exit the interior of the airbag cushion 200 through vent tubes 230 during deployment and if complete inflation of the airbag cushion 200 is not desired.

One or more vent tubes, such as vent tubes 230, may be located where desired on the airbag cushion 200. The diameter of the vent tubes 230 can be adjusted by controlling the area of the opening at the vent tube exit 234. For example, the area of the opening at the vent tube exit 234 may be sewn or bonded to adjust the size of the opening. The location of a vent tube on the airbag cushion 200 may depend on the airbag module deployment angle, vehicle interior geometry, and cushion fold type. For example, vent tubes 230 may be located on the side, top, bottom, or rear of the airbag cushion 200. The size and length of the vent tubes 230 may be modified as desired and adjusted to control and optimize venting and closing during airbag deployment. The vent tubes 230 may be attached to the airbag cushion 200 by any appropriate method such as by sewing, stapling, or using an adhesive. The vent tubes 230 may also be integral to the airbag cushion 200.

Figure 2:
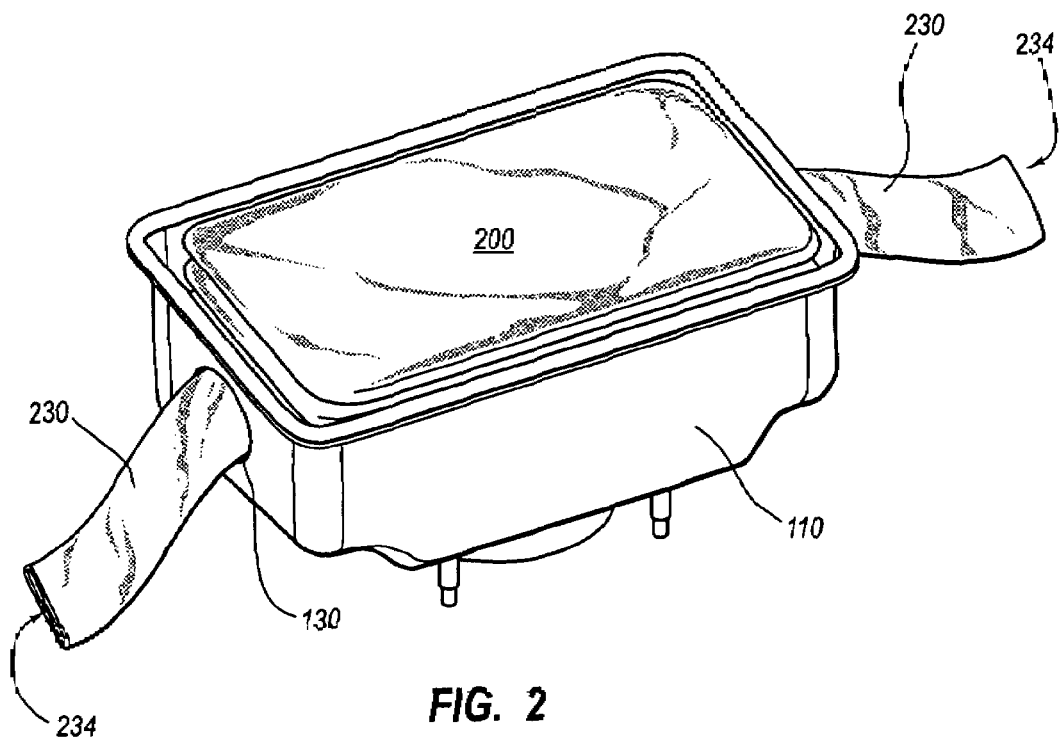
FIG. 2 is a schematic view of an airbag module.

With continued reference to FIG. 1 and FIG. 2, the airbag module 100 may include a module housing 110 configured with one or more housing openings such as housing openings 130 configured to be aligned with the vent tubes 230 and allow the vent tubes 230 to vent inflation gas through the housing openings 130 during airbag deployment. In one embodiment, the alignment of the vent tubes 230 with the housing openings 130 may be controlled by cinching the vent tubes 230 after the airbag cushion 200 has been folded (not shown). The vent tubes 230 may extend through the housing openings 130 and beyond the module housing 110 before deployment and during deployment.

Figure 3:
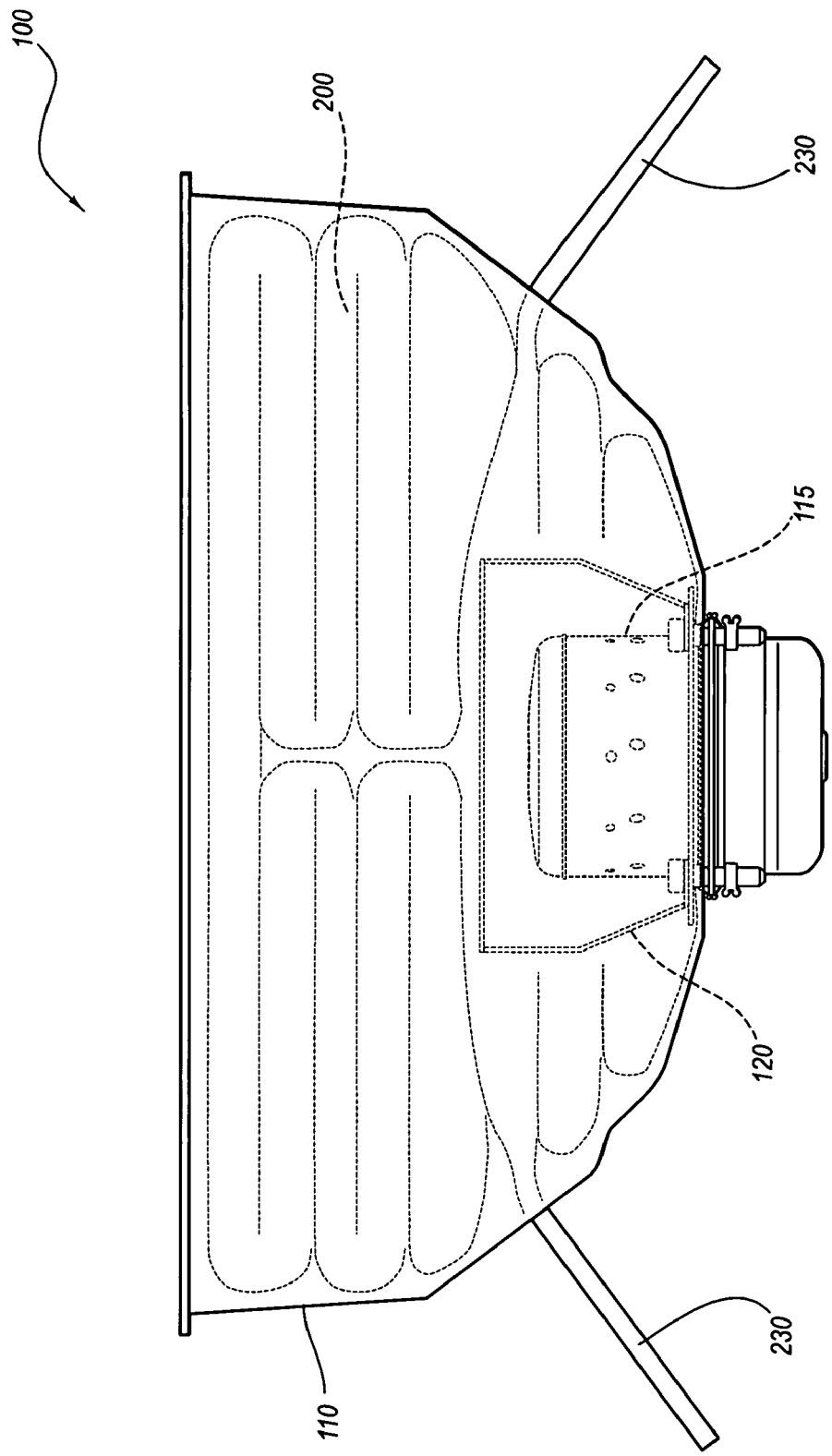
FIG. 3 is a side view of an airbag module.

Referring to FIG. 3, the airbag module 100 may also include a diffuser such as diffuser 120 configured to direct the inflation gas toward the vent tubes 230 during airbag inflation. More particularly, a loop diffuser may be sewn inside the airbag cushion 200. Alternatively, the module housing 110 can include a housing diffuser. The diffuser 120 may be attached to the airbag cushion 200 or disposed on the module housing 110. The diffuser may be rectangular, trapezoidal, hexagonal, round, etc. It may also have a portion which is round or elliptical while other portions are angled.

If a vehicle occupant is in a normal position and airbag inflation is unrestricted, diffuser 120 functions to direct at least a portion of the inflation gas generally toward the vent tube(s). However, because diffuser 120 and vent tubes 230 are independent of each other, the airbag cushion side panels can expand and move during inflation such that the inflation gas flow becomes misaligned with the vent tubes 230. In this way, the vent tubes 230 may be closed as the airbag cushion fully expands thus, retaining gas for normal occupant restraint.

Figure 4A:
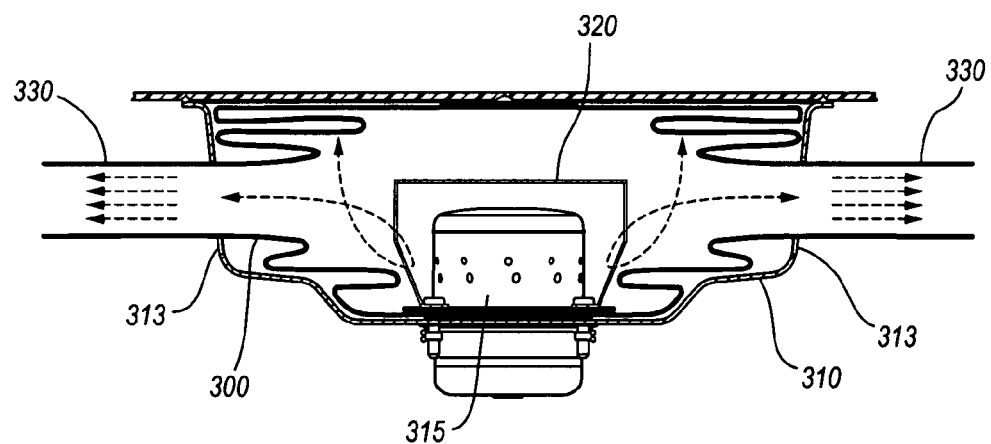
FIG. 4A is a cross-sectional view of an airbag module.
Figure 4B:
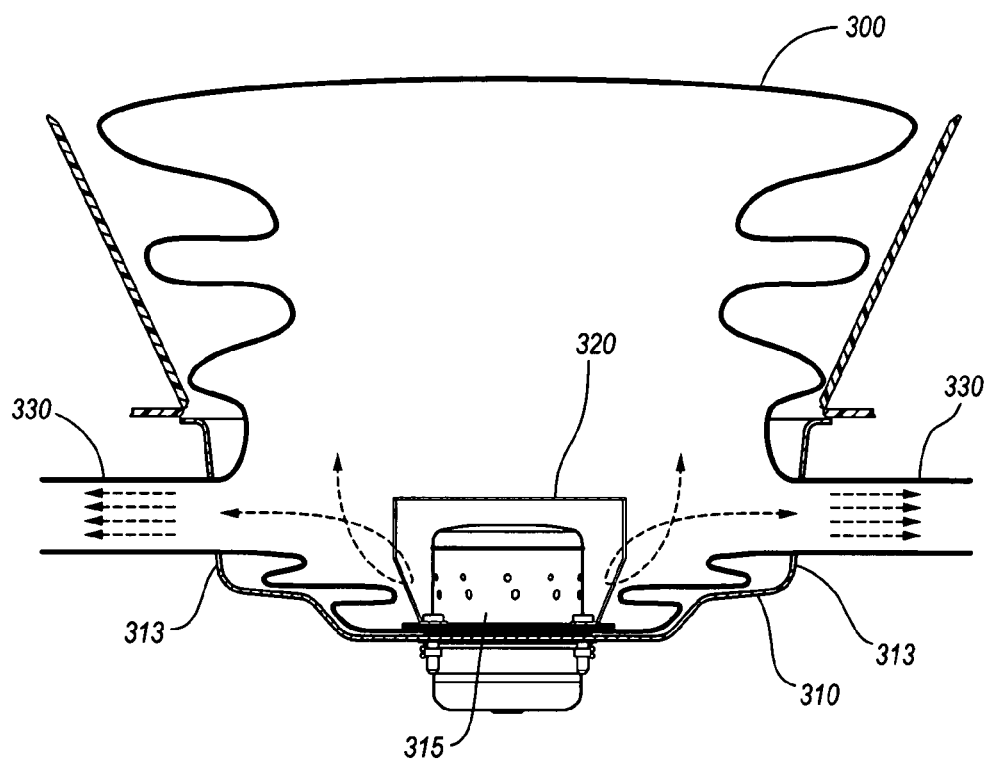
FIG. 4B is a cross-sectional view of a partially deployed airbag module.
Figure 4C:
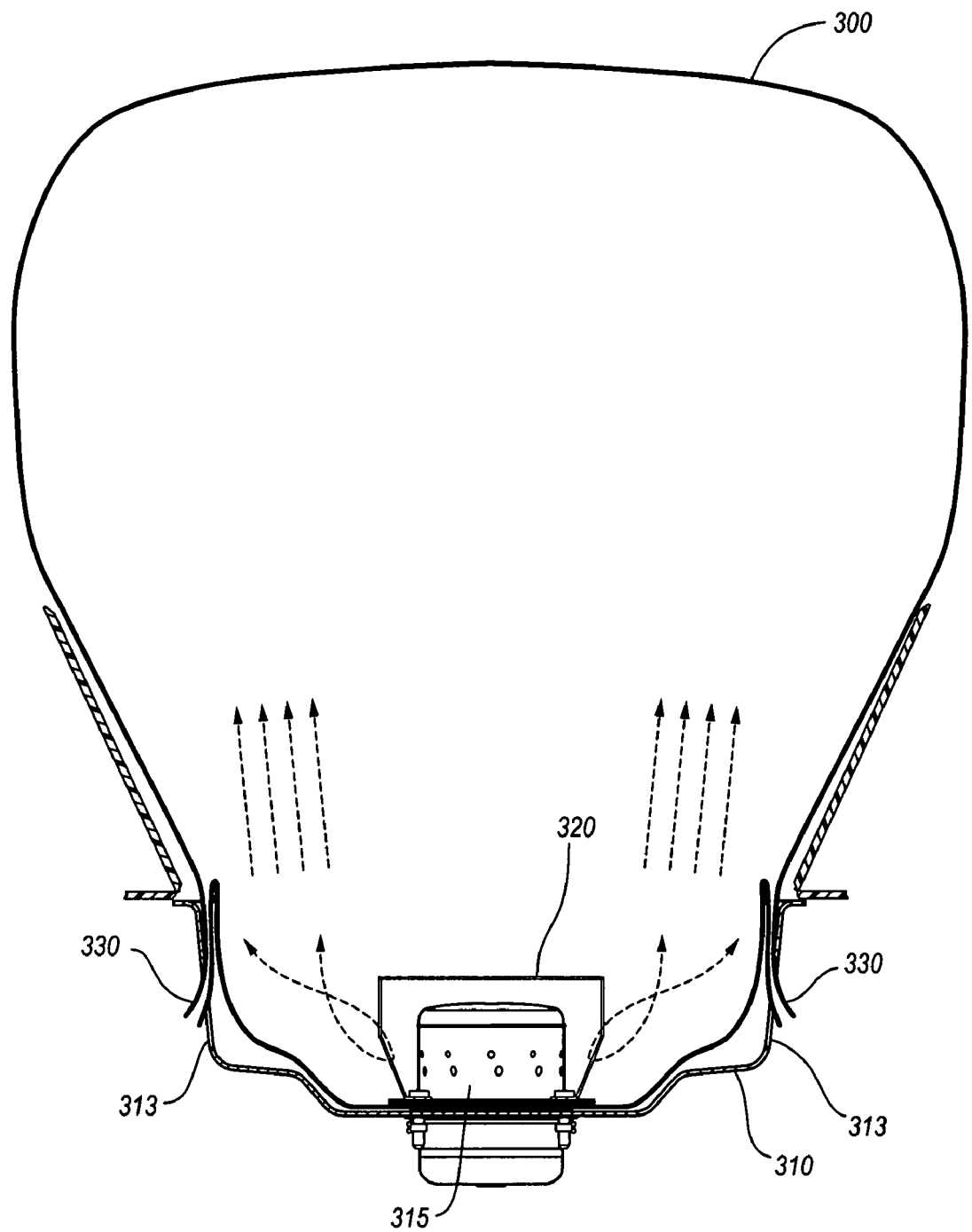
FIG. 4C is a cross-sectional view of a fully deployed airbag module.

FIGS. 4A-4C provide a cross-sectional view of an airbag cushion 300 deploying from a module housing 310. For illustrative purposes, multiple vent tubes 330 are shown in FIGS. 4A-4C, however one or more vent tubes may be used to vent the inflation gas from the airbag cushion 300. In FIG. 4A, the initially deploying airbag cushion 300 may include vent tubes 330 symmetrically attached and extending out of the module housing 310 at housing openings 313. In the undeployed state, the airbag cushion 300 may be folded within the module housing 310 and may include areas of slack both above and below the vent tubes 330 as shown by FIG. 4A. Upon initial deployment of the airbag cushion 300, the inflation gasses, represented by the arrows, are generated by the inflator 315 and may flow out of the diffuser 320 and into the airbag cushion 300 and out of the vent tubes 330.

As shown by FIG. 4B, as the inflation gasses begin to fill the airbag cushion 300, the folds above the vent tubes 330 begin to expand allowing the airbag cushion 300 to deploy beyond the module housing 310. At this time, the vent tubes 330 are still open and the inflation gasses may exit the vent tubes 330. If the airbag cushion 300 does not encounter any obstruction during deployment, it may fully inflate as illustrated by FIG. 4C.

Figure 4D:
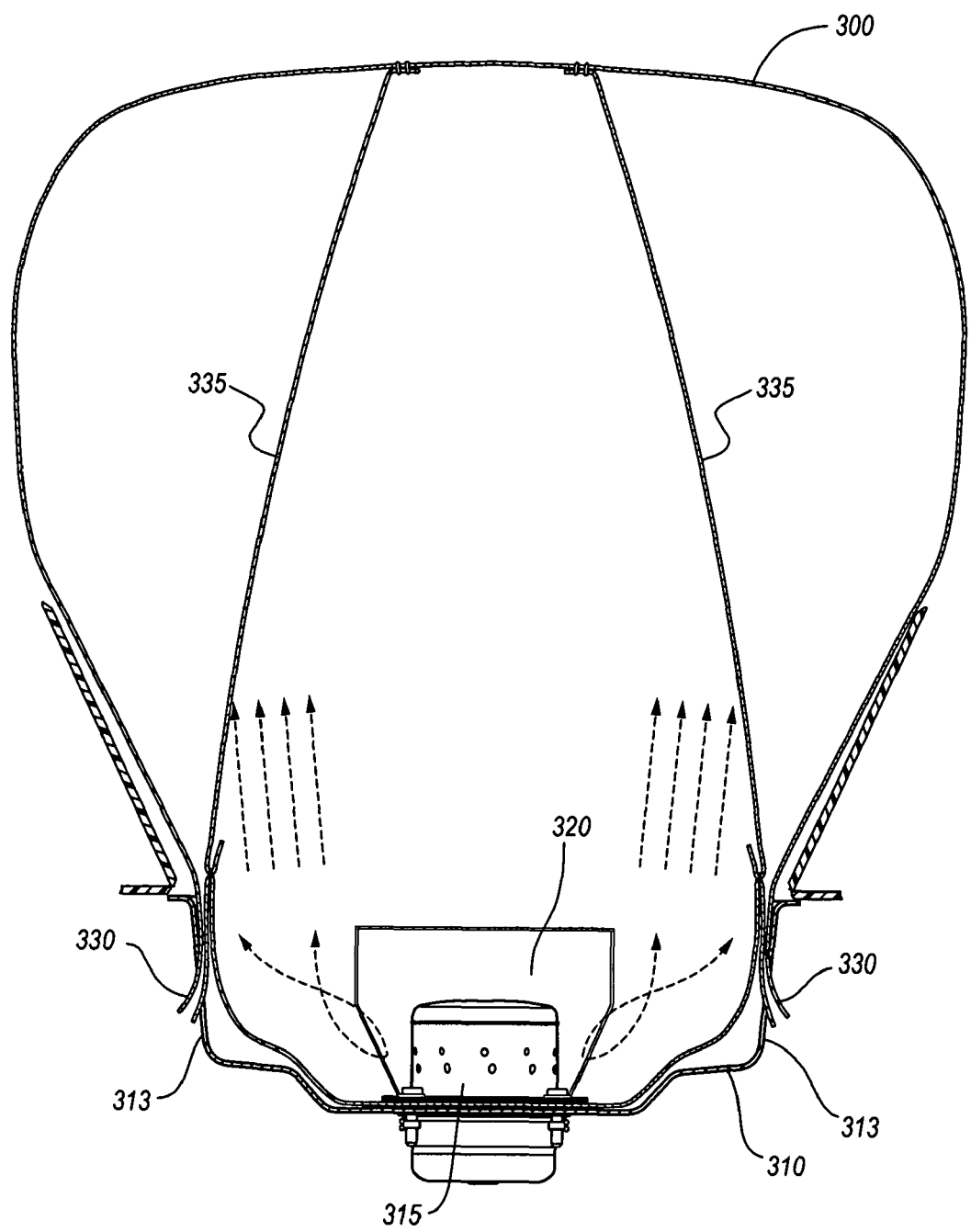
FIG. 4D is a cross-sectional view of a fully deployed airbag module with tethered vent tubes.

With continued reference to FIG. 4C, as the airbag cushion 300 nears full inflation, the folds in the fabric both above and below the vent tubes 330 may have been removed and the tension of the inflating airbag cushion 300 may place the vent tubes 330 out of alignment with the housing openings 313. As the vent tubes 330 are moved out of alignment with the housing openings 313 they may be pulled through the housing openings 313 at an angle thereby obstructing the exit of the inflation gases out of the at least partially closed vent tubes 330. The obstruction of the vent tubes 330 may allow the inflation gasses to fully inflate the airbag cushion 300 and provide the optimal protection for a properly positioned occupant. In another embodiment shown by FIG. 4D, the vent tubes 330 may be tethered to the airbag cushion 300 such that as the airbag cushion 300 nears full inflation the tension of the inflating airbag will tighten the tethers and cause the vent tubes 330 to be withdrawn from the housing openings 313 and pulled closed. With continued reference to FIG. 4D, tethers 335 may be attached to the vent tubes 330 and to the internal surface of the airbag cushion 300. When the airbag cushion 300 is in the undeployed or partially deployed state, the tethers 335 would be slack within the airbag leaving the vent tubes 330 open for the exit of inflation gasses. However, when the airbag cushion 300 is fully inflated, the expansion of the pressure of the inflation gasses against the internal surface of the airbag cushion 300 may tighten the tethers 335 and cause the vent tubes 330 to be at least partially closed under the tension from the tethers 335.

Figure 5A:
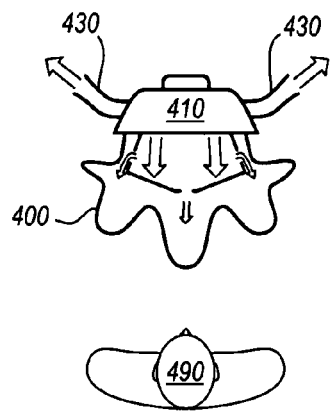
FIGS. 5A-5C show the deployment of an airbag module with a normally positioned occupant.
Figure 5B:
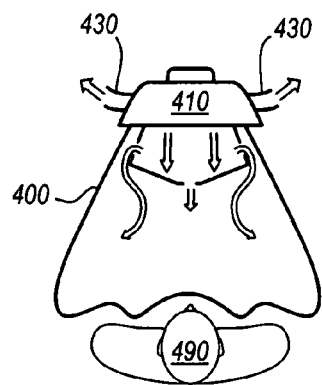
Figure 5C:
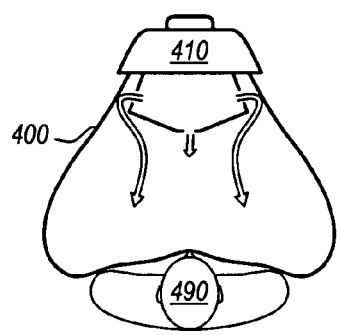

FIGS. 5A-5C illustrate yet another embodiment showing the inflation of a deploying airbag cushion 400 without obstruction in the deploying path. The depicted airbag module housing 410 may include an airbag cushion 400 comprising two vent tubes 430 symmetrically disposed on the airbag cushion 400. Additional vents (not shown) may be optional in certain airbag cushion embodiments based on venting requirements. The location and number of vent tubes 430 may vary according to design and function. An occupant 490 is in a normal seating position which will allow the airbag cushion 400 to fully expand before impacting the occupant. In this manner, the occupant 490 benefits from the full restraint capability of the airbag cushion 400.

In FIG. 5A, the initial breakout of the airbag cushion 400 occurs. The vent tubes 430 are open and, in the depicted embodiment, extend from the airbag cushion 400 and through the airbag module housing 410. In FIG. 5B, the vent tubes 430 are slightly (as shown), or fully withdrawn from the airbag module housing 410, partially closing the vent tubes 430 and restricting gas flow through the vent tubes 430. Vent tubes 430 may also be closed from within the interior of the airbag cushion 400 (not shown). In FIG. 5C, vent tubes 430 are completely closed and normal restraint is provided to the occupant 490.

Figure 6A:
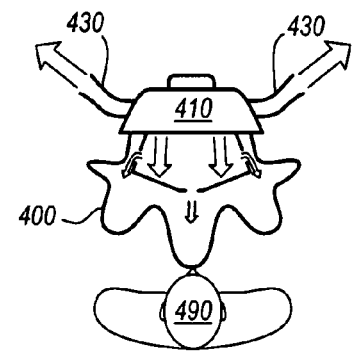
FIGS. 6A-6C show the deployment of an airbag module with an out-of-position occupant.
Figure 6B:
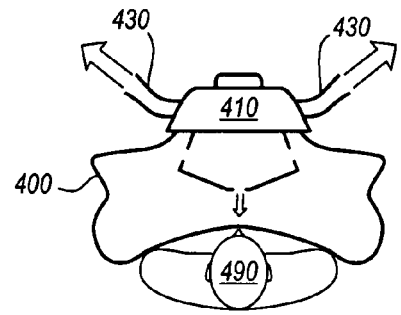
Figure 6C:
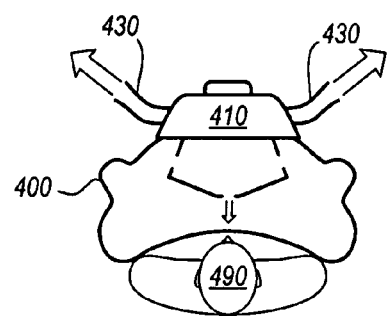

FIGS. 6A-6C illustrate the inflation of a deploying airbag cushion 400 with obstruction in the deploying path. An occupant 490 may be out-of-position and obstruct the deploying airbag cushion 400 and prevent the airbag cushion 400 from fully inflating. In FIG. 6A, airbag cushion 400 begins initial deployment as in FIG. 5A. In FIG. 6B, airbag cushion 400 impacts the occupant 490 and the vent tubes 430 remain open and venting of the inflation gas occurs from the vent tubes 430. The inflation of airbag cushion 400 is restricted and the occupant 490 receives less than the full deployment force of the airbag cushion 400. In this way, potential injury to an out-of-position passenger from the initial punch-out forces of an inflatable airbag may be avoided. In FIG. 6C, cushion 400 is partially inflated and provides limited restraint while venting may continue through vent tubes 430.

Various embodiments for vent tubes have been disclosed herein. The vent tubes disclosed herein are examples of means for venting gas out of the airbag during deployment. The vent tubes in combination with the housing openings are examples of venting means for airbag deployment without obstruction and enabling the venting means to remain open upon airbag deployment with obstruction. The diffusers disclosed herein are examples of means for diffusing gas by re-directing inflation gas to the venting means from an inflator such that the gas exits the inflatable airbag cushion by way of the venting means when deployment of the airbag is obstructed.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112¶6. The scope of the invention is therefore defined by the following claims.

The invention claimed is:
1. An airbag module, comprising:
an airbag module housing, wherein the airbag module housing comprises at least one housing opening;

an inflatable airbag cushion disposed inside the airbag module housing, wherein the inflatable airbag cushion comprises at least one vent tube;

wherein the at least one vent tube extends outwardly through the at least one housing opening in an aligned configuration with the at least one housing opening such that the at least one vent tube is open and can move relative to the at least one housing opening;

whereby during deployment of the inflatable airbag cushion with obstruction, the at least one vent tube remains open, continues to extend through the at least one housing opening in the aligned configuration, and vents inflation gas; and during inflatable airbag cushion deployment without obstruction, inflation gas causes tension of the inflatable airbag cushion that pulls at least a section of the at least one vent tube through the at least one housing opening at an angle with respect to the aligned configuration to flexibly flatten the at least vent tube against the at least one housing opening so that the at least one vent tube at least partially closes.

2. The airbag module of claim 1, further comprising:

at least one tether attached to the at least one vent tube, wherein the tether is configured to pull the at least one vent at least partially inside the at least one housing opening during deployment of the inflatable airbag cushion without obstruction.

3. The airbag module of claim 2, wherein a first end of the at least one tether is attached to the at least one vent tube and a second end of the at least one tether is attached to the interior surface of the inflatable airbag cushion.

4. The airbag module of claim 1, wherein the at least one vent tube is integral to the inflatable airbag cushion.

5. The airbag module of claim 1, wherein the at least one vent tube comprises two vent tubes attached to the inflatable airbag cushion.

6. An airbag module, comprising:

an airbag module housing comprising at least one housing opening;

an inflatable airbag cushion disposed within the airbag module housing, wherein the inflatable airbag cushion comprises at least one vent tube;

wherein the at least one vent tube extends outwardly through the at least one housing opening in an aligned configuration with the at least one housing opening such that the at least one vent tube is open and can move relative to the at least one housing opening; and at least one diffuser disposed within the inflatable airbag cushion configured to re-direct inflation gas to the at least one vent tube from an inflator such that the gas exits the inflatable airbag cushion by way of the at least one vent tube when deployment of the airbag is obstructed;

whereby during deployment of the inflatable airbag cushion with obstruction, the at least one vent tube remains open, continues to extend through the at least one housing opening in the aligned configuration, and vents inflation gas; and during inflatable airbag cushion deployment without obstruction, inflation gas causes tension of the inflatable airbag cushion that pulls at least a section of the at least one vent tube through the at least one housing opening at an angle with respect to the aligned configuration to flexibly flatten the at least vent tube against the one housing opening so that the at least one vent tube at least partially closes.

7. The airbag module of claim 6, wherein the at least one diffuser is attached to the inflatable airbag cushion.

8. The airbag module of claim 6, further comprising:

at least one tether attached to the at least one vent tube, wherein the tether is configured to pull the at least one vent tube at least partially inside the housing opening during deployment of the inflatable airbag cushion without obstruction.

9. The airbag module of claim 8, wherein a first end of the at least one tether is attached to the at least one vent tube and a second end of the at least one tether is attached to the interior surface of the inflatable airbag cushion.

* * * * *